United States Patent
Jafri

(10) Patent No.: US 10,875,494 B2
(45) Date of Patent: Dec. 29, 2020

(54) ADAPTIVE BELT FOR IMPACT

(71) Applicant: Safran Seats USA LLC, Gainesville, TX (US)

(72) Inventor: Aamir F. Jafri, Little Elm, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/348,009

(22) PCT Filed: Aug. 8, 2017

(86) PCT No.: PCT/US2017/045909
§ 371 (c)(1),
(2) Date: May 7, 2019

(87) PCT Pub. No.: WO2018/089063
PCT Pub. Date: May 17, 2018

(65) Prior Publication Data
US 2019/0299922 A1     Oct. 3, 2019

Related U.S. Application Data

(60) Provisional application No. 62/419,088, filed on Nov. 8, 2016.

(51) Int. Cl.
*B60R 22/16* (2006.01)
*B64D 11/06* (2006.01)
(Continued)

(52) U.S. Cl.
CPC .............. *B60R 22/16* (2013.01); *B60R 22/28* (2013.01); *B60R 22/30* (2013.01); *B64D 11/062* (2014.12);
(Continued)

(58) Field of Classification Search
CPC ...................................................... B60R 22/16
See application file for complete search history.

(56) References Cited

U.S. PATENT DOCUMENTS 3,444,957 A * 5/1969 Ervin, Jr. .................. F16F 7/00
                                                         182/3
3,891,272 A * 6/1975 Takada .................... B60R 22/16
                                                        297/472
(Continued)

FOREIGN PATENT DOCUMENTS

| DE | 2221427 A1 | 11/1973 |
|---|---|---|
| DE | 9401314 U1 | 4/1994 |

(Continued)

OTHER PUBLICATIONS

International Patent Application No. PCT/US2017/045909, Search Report and Written Opinion, dated Oct. 24, 2017.

*Primary Examiner* — Timothy J Brindley
(74) *Attorney, Agent, or Firm* — Kilpatrick Townsend & Stockton LLP

(57) ABSTRACT

An adaptive belt is attached to a vehicle seat and includes a first section (101), a second section (102), and a third section (103). The adaptive belt includes a retracted configuration and a fully extended configuration. In the retracted configuration, the adaptive belt is folded between the first section and the second section such that a first attachment attaches the first section to a first portion of the second section. In the retracted configuration, the adaptive belt is also folded between the second section and the third section such that a second attachment attaches a second portion of the second section to a first portion of the third section. In the fully extended configuration, all of the attachments fail thereby increasing a length of the adaptive belt. In response to a (Continued)

threshold loading condition, the adaptive belt changes from the retracted configuration to the fully extended configuration.

20 Claims, 5 Drawing Sheets

(51) Int. Cl.
*B60R 22/30* (2006.01)
*B64D 25/02* (2006.01)
*B60R 22/28* (2006.01)

(52) U.S. Cl.
CPC ........ B64D 25/02 (2013.01); *B60R 2022/283* (2013.01)

(56) References Cited

U.S. PATENT DOCUMENTS

| | | | | |
|---|---|---|---|---|
| 4,027,906 A | * | 6/1977 | Matsuoka | B60R 22/001 280/751 |
| 4,588,208 A | * | 5/1986 | Yoshitsugu | B60R 22/16 188/376 |
| 4,618,026 A | * | 10/1986 | Olson | A62B 35/04 182/4 |
| 5,050,906 A | | 9/1991 | Kneip | |
| 5,529,343 A | | 1/1996 | Klink | |
| 5,547,223 A | * | 8/1996 | Koketsu | B60R 22/16 280/801.1 |
| 5,658,012 A | * | 8/1997 | Villarreal | B60R 22/16 280/805 |
| 5,718,455 A | * | 2/1998 | Kawaguchi | B60R 22/16 188/376 |
| 5,788,280 A | * | 8/1998 | Ohsumi | B60R 22/023 280/805 |
| 7,306,260 B1 | * | 12/2007 | Park | B60R 22/16 280/801.1 |
| 7,650,717 B2 | * | 1/2010 | Drayer | A01G 17/10 47/32.5 |
| 7,909,137 B2 | * | 3/2011 | Green | A01M 31/02 182/3 |
| 10,214,132 B2 | * | 2/2019 | Wang | A01K 1/0272 |
| 10,537,758 B2 | * | 1/2020 | Comet | A62B 35/04 |
| 10,604,259 B2 | * | 3/2020 | Browning | B60R 21/01554 |

FOREIGN PATENT DOCUMENTS

| | | |
|---|---|---|
| EP | 0408909 A2 | 1/1991 |
| GB | 1015298 A | 12/1965 |
| WO | 2017083607 A1 | 5/2017 |

* cited by examiner

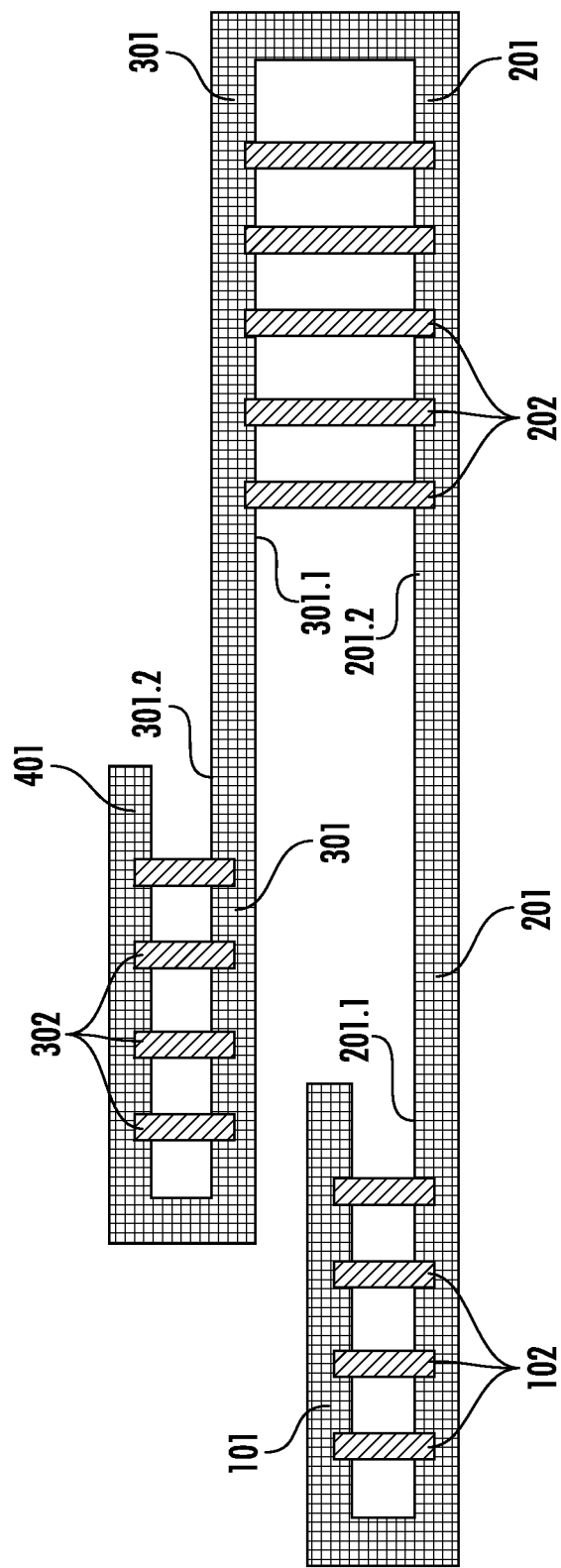

ADAPTIVE BELT FOR IMPACT

CROSS REFERENCE TO RELATED APPLICATION

This application is related to and claims priority benefit from U.S. Provisional Application No. 62/419,088 ("the '088 application"), filed on Nov. 8, 2016, entitled ADAPTIVE BELT WITH BREAK-AWAY STITCH AND LONGER WEBBING. The '088 application is hereby incorporated in its entirety by this reference.

FIELD OF THE INVENTION

The field of the invention relates to adaptive belts reducing head impacts for occupants in seats for aircraft or the like.

BACKGROUND

Passenger seats, and particularly vehicle or aircraft passenger seats, are designed to ensure passenger safety for various loading conditions including, for example, hard landings and crash conditions. In some instances, regulatory and/or governmental requirements dictate that seats comply with occupant protection/head impact tests. The general intent is that the seat has a belt (such as a lap belt) designed to restrain the occupant during certain load conditions. Conventional belts restrain the occupant such that the occupant's upper body moves forward due to rapid deceleration of the vehicle or aircraft (pivoting about the location of restraint by the belt, typically near the pelvis) and causing the occupant's head to impact a seatback from the next row forward. Reducing head accelerations/decelerations and the related forces decrease the likelihood of head trauma and head injuries. However, the seat and the belt must also withstand typical less severe loads, such as stretching and staining related to the belt and other non-crash loading conditions.

In certain situations, it may be desirable to include a belt that adapts its length in response to specific loads or loading conditions such that the occupants lower body moves forward. Allowing the occupant's lower body (e.g., pelvis) to move forward in response to rapid deceleration (in some cases approximately matching the movement of the occupant's upper body) may reduce the severity of head impacts. Movement of the lower body reduces the rotation of the occupant about the location of restraint by the belt and thus reduces the likelihood and/or severity of head impacts on the seatback from the next row forward.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an adaptive belt attached to a vehicle seat, the adaptive belt comprises: a first section, a second section, and a third section, wherein: the adaptive belt comprises a retracted configuration and a fully extended configuration; in the retracted configuration, the adaptive belt is folded between the first section and the second section such that a first attachment attaches the first section to a first portion of the second section; in the retracted configuration, the adaptive belt is folded between the second section and the third section such that a second attachment attaches a second portion of the second section to a first portion of the third section; in the fully extended configuration, all of the attachments fail thereby increasing a length of the adaptive belt; and in response to a threshold loading condition, the adaptive belt changes from the retracted configuration to the fully extended configuration.

In some embodiments, the first attachment and the second attachment each comprise at least one of stitching, adhesive, and mechanical fasteners.

The first portion of the second section and the second portion of the second section, in certain embodiments, are immediately adjacent one another on opposite surfaces of the second section.

In some embodiments, the first portion of the second section and the second portion of the second section are isolated from one another.

The threshold loading condition, in certain embodiments, comprises a crash load.

In certain embodiments, the first attachment fails in response to a first load and the second attachment fails in response to a second load, wherein the second load is larger than the first load.

The adaptive belt, in certain embodiments, further comprises an intermediate configuration wherein: in the intermediate configuration, the first attachment fails but the second attachment does not fail; and in the intermediate configuration, the adaptive belt comprises an intermediate length that is greater than a length of the adaptive belt in the retracted configuration but less than a length of the adaptive belt in the fully extended configuration.

In certain embodiments, the adaptive belt further comprises a fourth section wherein, in the retracted configuration, the adaptive belt is folded between the third section and the fourth section such that a third attachment attaches a second portion of the third section to the fourth section.

The adaptive belt, in certain embodiments, further comprises a first intermediate configuration and a second intermediate configuration, wherein: in the first intermediate configuration, the first attachment fails but the second attachment and the third attachment do not fail; in the second intermediate configuration, the first attachment and the second attachment fail but the third attachment does not fail; and in the second intermediate configuration, the adaptive belt comprises a second intermediate length that is greater than (i) a length of the adaptive belt in the retracted configuration and (ii) a length of the adaptive belt in the first intermediate configuration but less than a length of the adaptive belt in the fully extended configuration.

In some embodiments, at least one of the first section, second section, and third section comprises a delay feature to ensure that all of the attachments do not fail simultaneously.

According to certain embodiments of the present invention, a passenger seat for an aircraft comprises: an adaptive belt attached to a frame of the passenger seat, the adaptive belt comprising at least a first section, a second section, and a third section, wherein: the adaptive belt comprises a retracted configuration and a fully extended configuration; in the retracted configuration, the adaptive belt is folded between the first section and the second section such that a first attachment attaches the first section to a first portion of the second section; in the retracted configuration, the adaptive belt is folded between the second section and the third section such that a second attachment attaches a second portion of the second section to a first portion of the third section; in the fully extended configuration, all of the attachments fail thereby increasing a length of the adaptive belt; and in response to a threshold loading condition, the adaptive belt changes from the retracted configuration to the fully extended configuration.

In certain embodiments, the first attachment and the second attachment each comprise at least one of stitching, adhesive, and mechanical fasteners.

In some embodiments, the first portion of the second section and the second portion of the second section are immediately adjacent one another on opposite surfaces of the second section.

The threshold loading condition, in certain embodiments, comprises a crash load.

In certain embodiments, the first attachment fails in response to a first load and the second attachment fails in response to a second load, wherein the second load is larger than the first load.

The passenger seat, in certain embodiments, further comprises an intermediate configuration wherein: in the intermediate configuration, the first attachment fails but the second attachment does not fail; and in the intermediate configuration, the adaptive belt comprises an intermediate length that is greater than a length of the adaptive belt in the retracted configuration but less than a length of the adaptive belt in the fully extended configuration.

In certain embodiments, the passenger seat of further comprises a fourth section wherein, in the retracted configuration, the adaptive belt is folded between the third section and the fourth section such that a third attachment attaches a second portion of the third section to the fourth section.

The passenger seat, in certain embodiments, further comprises a first intermediate configuration and a second intermediate configuration, wherein: in the first intermediate configuration, the first attachment fails but the second attachment and the third attachment do not fail; in the second intermediate configuration, the first attachment and the second attachment fail but the third attachment does not fail; and in the second intermediate configuration, the adaptive belt comprises a second intermediate length that is greater than (i) a length of the adaptive belt in the retracted configuration and (ii) a length of the adaptive belt in the first intermediate configuration but less than a length of the adaptive belt in the fully extended configuration.

In some embodiments, at least one of the first section, second section, and third section comprises a delay feature to ensure that all of the attachments do not fail simultaneously.

According to certain embodiments of the present invention, an adaptive belt attached to a vehicle seat, the adaptive belt comprises: a first section, a second section, and a third section, wherein: the adaptive belt comprises a retracted configuration, a fully extended configuration, and an intermediate configuration; in the retracted configuration, the adaptive belt is folded between the first section and the second section such that a first plurality of stitches attaches the first section to a first portion of the second section; in the retracted configuration, the adaptive belt is folded between the second section and the third section such that a second plurality of stitches attaches a second portion of the second section to a first portion of the third section; in the fully extended configuration, the first plurality of stitches and the second plurality of stitches fail thereby causing the adaptive belt to change length to an extended length; in the intermediate configuration, the first plurality of stitches fails but the second plurality of stitches do not fail such that the adaptive belt comprises an intermediate length that is greater than a length of the adaptive belt in the retracted configuration but less than the extended length; in response to a first loading condition, the adaptive belt changes from the retracted configuration to the intermediate configuration; and in response to a second loading condition, the adaptive belt changes from the intermediate configuration to the fully extended configuration.

BRIEF DESCRIPTION OF THE DRAWINGS

FIG. 3 is a schematic view of an adaptive belt in a retracted configuration according to certain embodiments of the present invention.

DETAILED DESCRIPTION

Figure 1A:
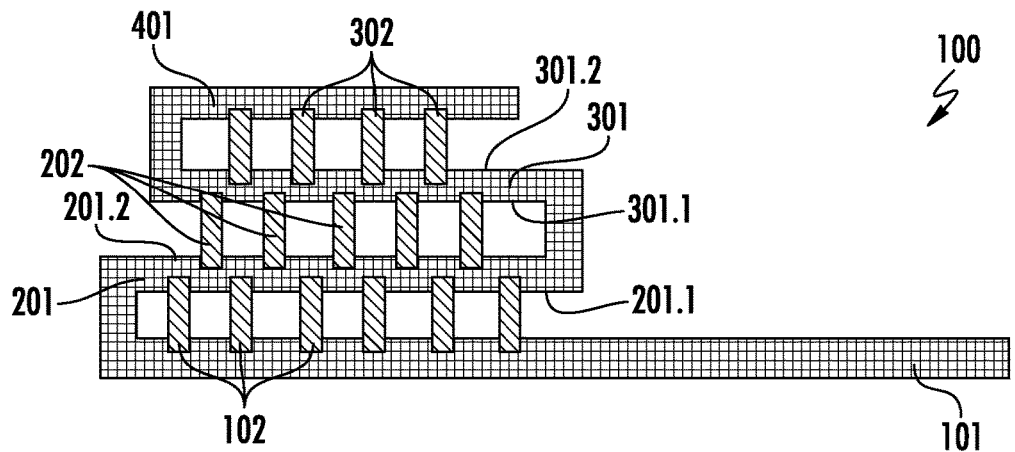
FIG. 1A is a schematic view of an adaptive belt in a retracted configuration according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-3 illustrate embodiments of adaptive belts 100 for passenger seats where the adaptive belts 100 are configured to restrain an occupant 10. In these embodiments, the adaptive belt 100 may include a plurality of sections including, for example, a first section 101, a second section 201, a third section 301, a fourth section 401, etc. In some cases, at least one of the sections is folded onto an adjacent portion of the adaptive belt 100.

In some embodiments, the adaptive belt 100 includes a typical or retracted configuration, which is shown in FIGS.

1A, 2A and 3. The adaptive belt 100 may maintain the retracted configuration for typical situations (and associated loading conditions) such as, for example, takeoff, normal flight, landing, dives, pullup, banking, turbulent flight, stall, etc. Conventional belts are only capable of the retracted configuration described herein and are not capable of adapting to a fully extended configuration (or any intermediate configuration). In some embodiments, in response to loading conditions that typically pull the adaptive belt 100 in the axial direction (such as force F shown in FIG. 2B), the adaptive belt 100 may change to different configurations. The adaptive belt 100 may include a fully extended configuration, which is shown in FIGS. 1D and 2B. In addition, the adaptive belt 100 may include at least one intermediate configuration, examples of which are shown in FIGS. 1B and 1C.

Figure 1B:
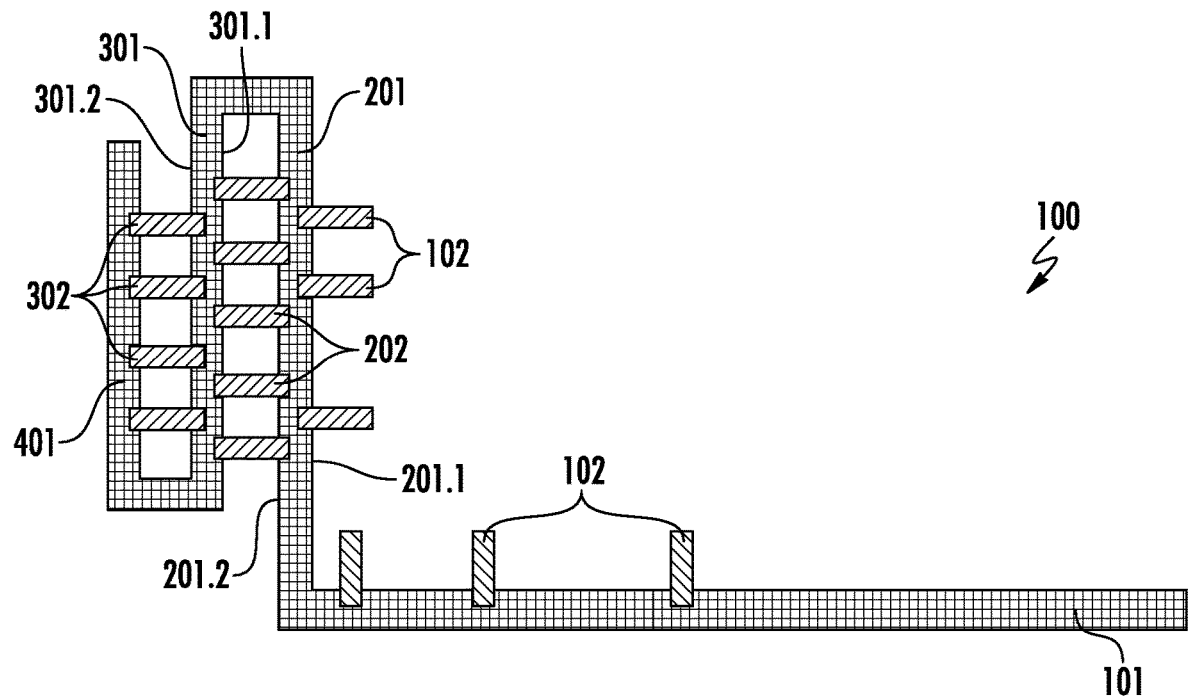
FIG. 1B is a schematic view of the adaptive belt of FIG. 1A in a first intermediate configuration.
Figure 1C:
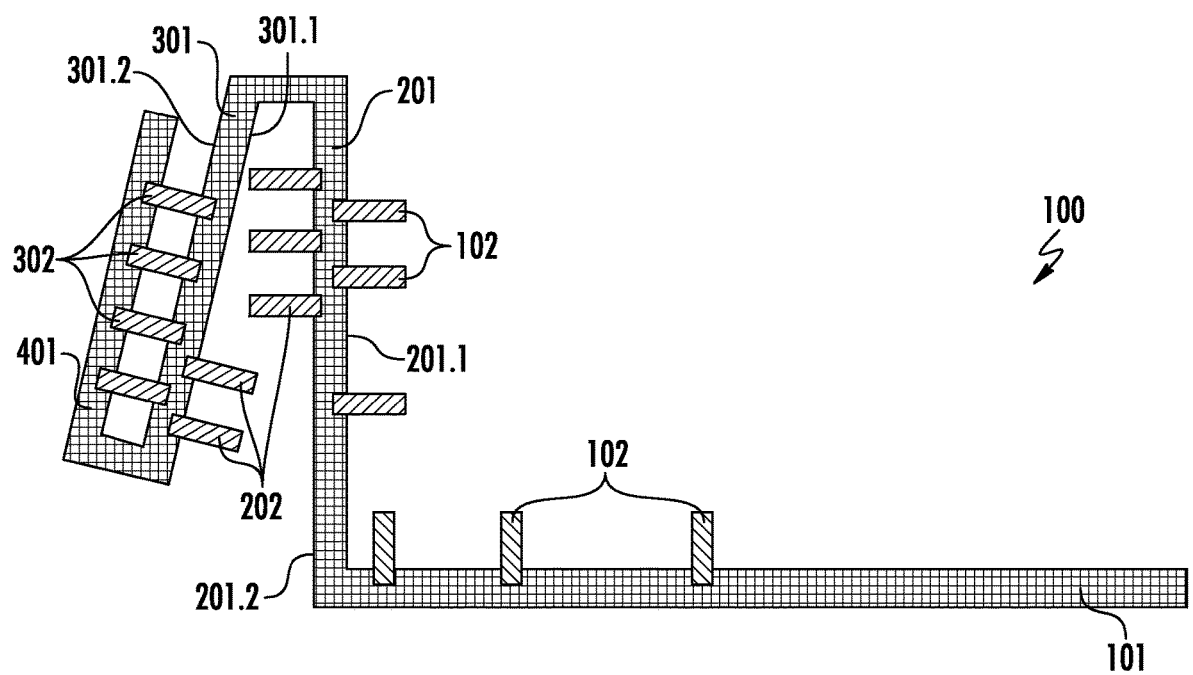
FIG. 1C is a schematic view of the adaptive belt of FIG. 1A in a second intermediate configuration.
Figure 1D:
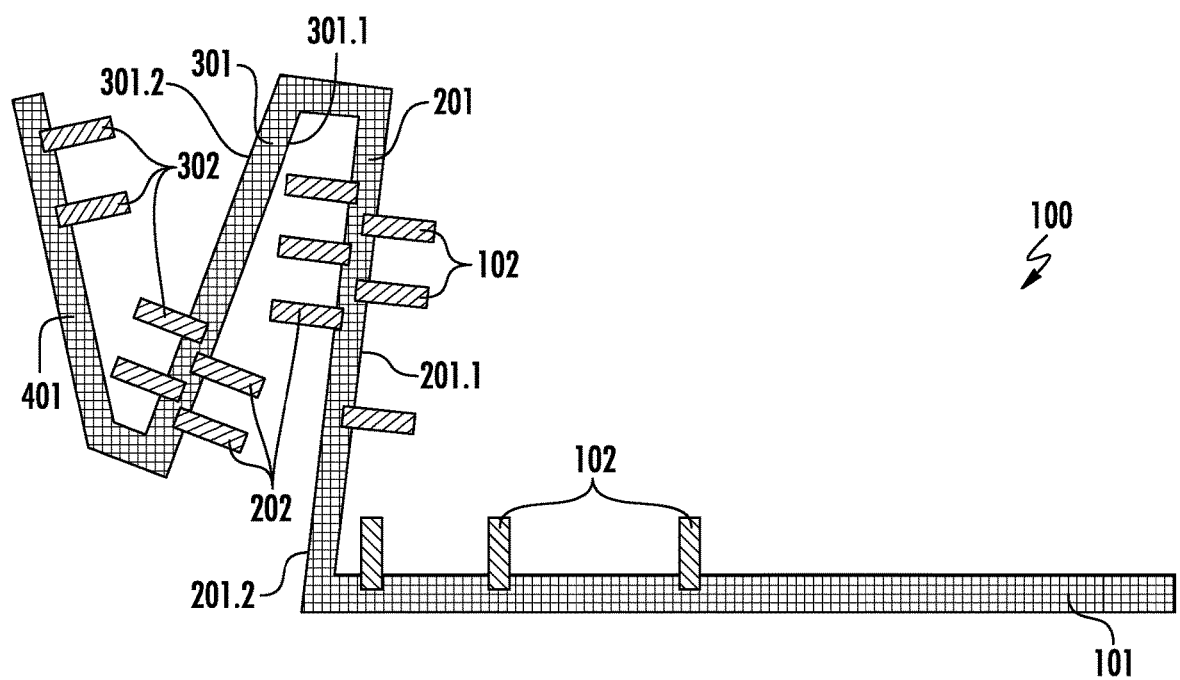
FIG. 1D is a schematic view of the adaptive belt of FIG. 1A in a fully extended configuration.
Figure 2A:
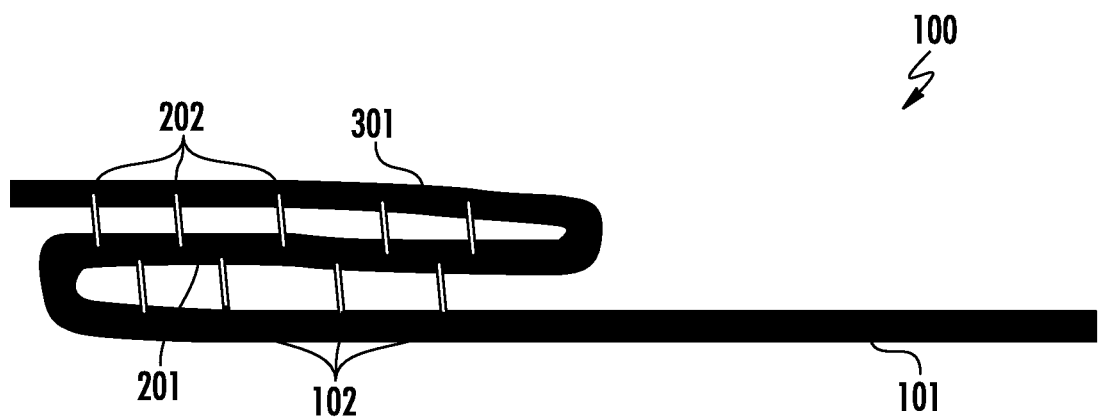
FIG. 2A is a schematic view of an adaptive belt in a retracted configuration according to certain embodiments of the present invention.
Figure 2B:
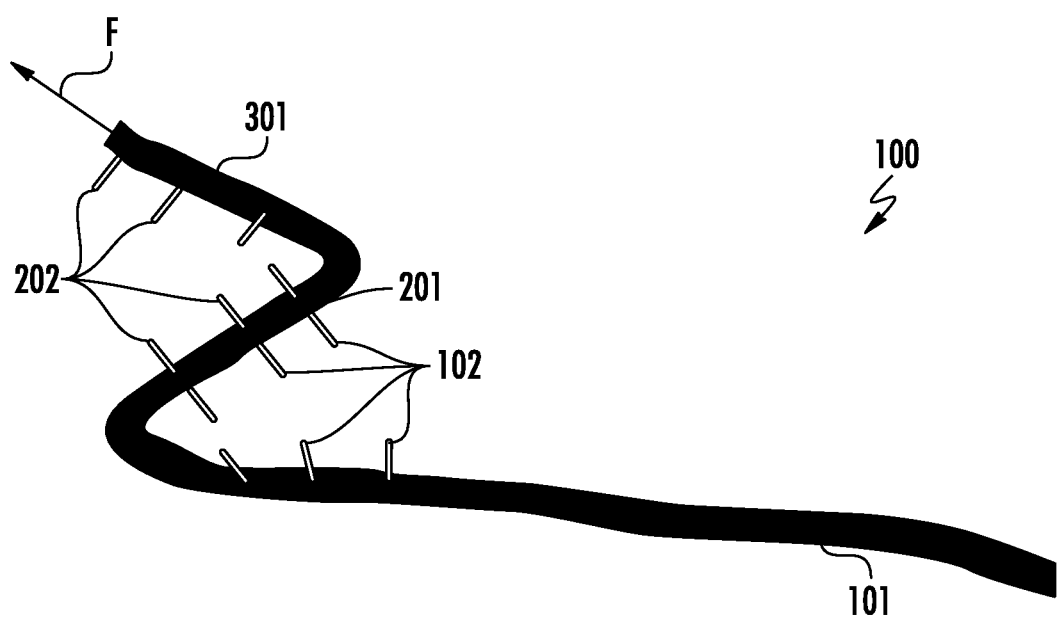
FIG. 2B is a schematic view of the adaptive belt of FIG. 2A in a fully extended configuration.

FIGS. 1A-1D illustrate embodiments of an adaptive belt 100 that includes at least four sections and FIGS. 2A and 2B illustrate embodiments of an adaptive belt 100 that includes at least three sections. As shown in FIG. 1A, which shows a retracted configuration, the adaptive belt 100 may be folded such that a surface of the first section 101 is adjacent to and is attached to the second section 201, the second section 201 may be attached to the third section 301, and the third section 301 may be attached to the fourth section 401. In the retracted configuration, the adaptive belt 100 is arranged in its minimum length. The respective attachments between the sections may be stitching, adhesive, mechanical fasteners (such as rivets or bolts that may have necked down portions), a combination thereof, or any other appropriate attachment. For example, as shown in the drawings, attachment 102 or stitches 102 may attach first section 101 and second section 201, attachment 202 or stitches 202 may attach second section 201 and third section 301, and attachment 302 or stitches 302 may attach third section 301 and fourth section 401. Although not shown in the drawings, the adaptive belt 100 may include a fifth section attached to the fourth section, a sixth section attached to the fifth section, etc. The attachments between the various sections are intended to fail at specific loads, as described in greater detail below.

As shown in FIG. 1D, to reach the fully extended configuration, all attachments fail (e.g., at least stitches 102, stitches 202, and stitches 302). In the fully extended configuration, none of the sections are attached together such that the adaptive belt 100 can stretch to its maximum length.

The adaptive belt 100 may also have at least one intermediate configuration (as shown in FIGS. 1B and 1C) where some (but not all) of the attachments have failed. FIG. 1B shows an example where stitches 102 have failed but stitches 202 and 302 are still attached between their respective portions of the adaptive belt 100. Similarly, FIG. 1C shows an example where stitches 102 and 202 have failed but stitches 302 are still attached between the third section 301 and the fourth section 401.

The attachments (e.g., stitches 102, stitches 202, and stitches 302) may fail by disengaging from the respective section (e.g., see FIGS. 1B-1D), may fail by breaking within the stitch itself such that portions of the stitch remains embedded within each of the respective section (e.g., see FIG. 2B), a combination thereof, or any other appropriate failure.

In some embodiments, the stitches 102 attach to the first section 101 and a first portion 201.1 of the second section 201 (see FIGS. 1A-3). In addition, the stitches 202 may attach to a second portion 201.2 of the second section 201 and a first portion 301.1 of the third section 301. The stitches 302 may attach to a second portion 301.2 of the third section 301 and the fourth section 401. As shown in FIGS. 1A-D, in certain embodiments, the first portion 201.1 and the second portion 201.2 of the second section 201 are disposed immediately adjacent one another on opposite surfaces of the second section 201 (i.e., the first portion 201.1 and the second portion 201.2 at least partially overlap). Such arrangement is appropriate for increasing efficiency for arranging the various section (explained below). In some embodiments, as shown in FIG. 3, the first portion 201.1 and the second portion 201.2 are isolated from one another and may share a common surface of the second section 201. The first portion 301.1 and the second portion 301.2 are isolated from one another and may be on opposite surfaces of the third section 301 (see FIG. 3).

Figure 4:
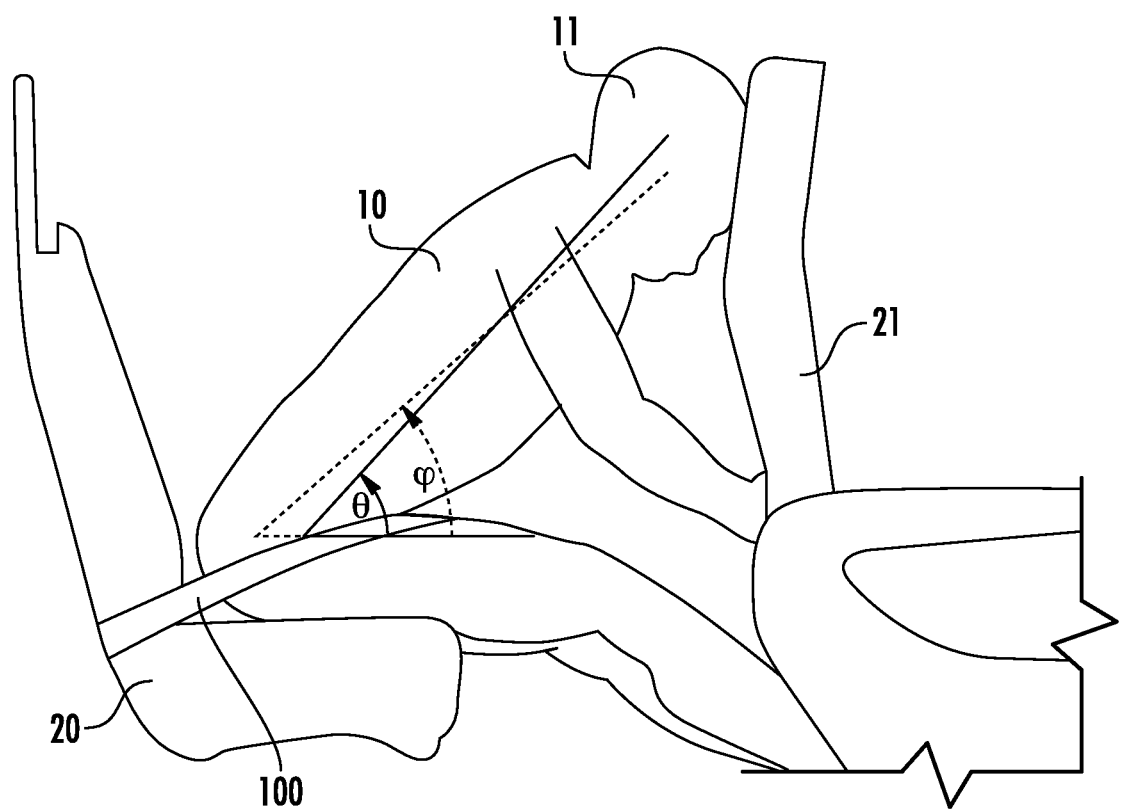
FIG. 4 is a side view of a passenger seat with an adaptive belt according to certain embodiments of the present invention.

During a loading condition involving excessive deceleration, which causes the occupant 10 to move forward (e.g., a crash load), the adaptive belt 100 may expand from the retracted configuration to the fully extended configuration (or to an intermediate configuration). In some cases, the length difference between the retracted configuration and the fully extended configuration depends on the pitch between adjacent seats. As shown in FIG. 4, the distance between seat 20 and the seat 21 (located in the forward direction) dictates how far the lower body (e.g., knees) of occupant 10 may move forward before impacting seat 21. The length of the adaptive belt 100 in the fully extended configuration may be designed to avoid contact between the lower body (e.g., knees) of occupant 10 and seat 21. A change in the length of adaptive belt 100 (e.g., moving from retracted configuration to an intermediate configuration or the fully extended configuration) accomplishes multiple benefits. Kinematic energy must be dissipated in response to the applied load. The lower body of the occupant 10 is allowed to move forward a given distance (based on the length of the adaptive belt 100 and the lengths associated with the various configurations) and this forward movement occurs over a duration based on the magnitude of the deceleration and the configurations of the adaptive belt 100. The movement of the lower body of the occupant 10 may be approximately equal to that of the upper body before the adaptive belt 100 reaches its final configuration (based on the specific load condition). Some of the kinetic energy associated with the occupant 10 is dissipated by breaking at least of the attachments 102, 202, 302. Once the adaptive belt 100 reaches its final configuration (an intermediate configuration or the fully extended configuration), the occupant 10 rotates about the approximate location where the adaptive belt 100 interfaces with the occupant 10 (typically in the pelvic region) such that the upper body of the occupant 10 rotates forward. In some cases, the head 11 of the occupant 10 contacts the seat 21. As shown in FIG. 4, a conventional belt does not change length and the occupant begins rotating after very little or no delay after the deceleration begins such that the upper body of the occupant 10 rotates to angle of approximately $\varphi$. The adaptive belt 100 creates a time delay as the adaptive belt 100 moves to an intermediate configuration or the fully extended configuration and, as shown in FIG. 4, shifts the location of the rotation forward (within seat 20) such that the upper body of the occupant 10 rotates to angle of approximately $\theta$. Although less rotation occurs before the occupant reaches angle $\theta$ compared to angle $\varphi$, a significant amount kinetic energy is dissipated by breaking at least one of the attachments 102, 202, 302, extending the adaptive belt 100 to a longer configuration, moving the occupant forward within seat 20, and rotating the upper body of the occupant such that, if the head 11 of the occupant 10 impacts the seat 20, the adaptive belt 100 reduces the energy associated with the impact.

The attachments 102, 202, 302 may be configured to fail in stages or sequentially (i.e., not simultaneously). In some cases, it is desirable to ensure there is a delay between failure for the various attachments. Sequential failure (where the attachments do not all fail simultaneously) reduces the likelihood of unstable motion where slack is created in the belt (that results in a shock load applied to the belt). The stages may be based on the magnitude of the load applied to the adaptive belt 100 and/or may include other features in the adaptive belt 100. For example, in some embodiments, the attachment 102 may fail when subjected to a load simulating a 5 G crash for a $50^{th}$ percentile male occupant. In addition, the attachment 202 may fail when subjected to a load simulating a 10 G crash for a $50^{th}$ percentile male occupant. The attachment 302 may fail when subjected to a load simulating a 15 G crash for a $50^{th}$ percentile male occupant. In some embodiments, to ensure a delay between failures of the various attachments, at least one of the first section 101, second section 201, third section 301, fourth section 401, etc. may include a delay feature to ensure that all of the attachments do not fail simultaneously. For example, the delay feature may include an elastic portion that causes at least one of the sections to stretch before the subsequent attachment fails.

The attachments may fail in any appropriate sequence. The relative strength between the various attachments may be based on number/density of attachments, strength/type of attachments, or any other appropriate technique. For example, in some embodiments, attachment 102 comprises fewer stitches than attachment 202 and/or attachment 302 such that attachment 102 fails first. In certain cases, attachments 102, 202, and 302 all use the same number of stitches, but attachment 202 uses weaker stitches such that attachment 202 fails first. In some embodiments, the attachments (e.g., 102, 202, 302) are configured to all fail simultaneously when subjected to a threshold load.

FIGS. 1A-2B illustrate the adaptive belt 100 such that the attachments between the various sections overlap one another, which increases efficiency and allows the various sections to be arranged within a small portion of the adaptive belt 100. However, in some embodiments, the sections may be arranged in other configurations. For example, some or all of the sections may be located separate from one another such that they do not overlap (e.g., see FIG. 3). Moving the sections away from one another reduces the likelihood of a failure of one attachment affecting or interfering with another attachment. For example, when the attachment 102 and the attachment 202 are located immediately adjacent one another on opposite surfaces of the second section 201 (see FIGS. 1A-ID), failure of attachment 102 may affect the integrity of attachment 202 (or vice versa).

The components of the adaptive belt 100 may be formed of materials including, but not limited to, polyester, nylon, plastic, carbon composite, thermoplastic, aluminum, steel, other fabric materials, stainless steel, other plastic or polymer materials, other metallic materials, other composite materials, or other similar materials. Moreover, the components of the adaptive belt 100 may be attached to one another via suitable fasteners, which include, but are not limited to, screws, bolts, rivets or other mechanical or chemical fasteners.

In the following, further examples are described to facilitate understanding of aspects of the invention:

Example A

An adaptive belt attached to a vehicle seat, the adaptive belt comprising:
a first section, a second section, and a third section, wherein:
the adaptive belt comprises a retracted configuration and a fully extended configuration:
in the retracted configuration, the adaptive belt is folded between the first section and the second section such that a first attachment attaches the first section to a first portion of the second section;
in the retracted configuration, the adaptive belt is folded between the second section and the third section such that a second attachment attaches a second portion of the second section to a first portion of the third section;
in the fully extended configuration, all of the attachments fail thereby increasing a length of the adaptive belt; and
in response to a threshold loading condition, the adaptive belt changes from the retracted configuration to the fully extended configuration.

Example B

The adaptive belt of Example A or any of the preceding or subsequent examples, wherein the first attachment and the second attachment each comprise at least one of stitching, adhesive, and mechanical fasteners.

Example C

The adaptive belt of Example A or any of the preceding or subsequent examples, wherein the first portion of the second section and the second portion of the second section are immediately adjacent one another on opposite surfaces of the second section.

Example D

The adaptive belt of Example A or any of the preceding or subsequent examples, wherein the first portion of the second section and the second portion of the second section are isolated from one another.

Example E

The adaptive belt of Example A or any of the preceding or subsequent examples, wherein the threshold loading condition comprises a crash load.

Example F

The adaptive belt of Example A or any of the preceding or subsequent examples, wherein the first attachment fails in response to a first load and the second attachment fails in response to a second load, wherein the second load is larger than the first load.

Example G

The adaptive belt of Example A or any of the preceding or subsequent examples, further comprising an intermediate configuration wherein:

in the intermediate configuration, the first attachment fails but the second attachment does not fail; and in the intermediate configuration, the adaptive belt comprises an intermediate length that is greater than a length of the adaptive belt in the retracted configuration but less than a length of the adaptive belt in the fully extended configuration.

Example H

The adaptive belt of Example A or any of the preceding or subsequent examples, further comprising a fourth section wherein, in the retracted configuration, the adaptive belt is folded between the third section and the fourth section such that a third attachment attaches a second portion of the third section to the fourth section.

Example I

The adaptive belt of Example H or any of the preceding or subsequent examples, further comprising a first intermediate configuration and a second intermediate configuration, wherein:

in the first intermediate configuration, the first attachment fails but the second attachment and the third attachment do not fail:

in the second intermediate configuration, the first attachment and the second attachment fail but the third attachment does not fail; and in the second intermediate configuration, the adaptive belt comprises a second intermediate length that is greater than (i) a length of the adaptive belt in the retracted configuration and (ii) a length of the adaptive belt in the first intermediate configuration but less than a length of the adaptive belt in the fully extended configuration.

Example J

The adaptive belt of Example A or any of the preceding or subsequent examples, wherein at least one of the first section, second section, and third section comprises a delay feature to ensure that all of the attachments do not fail simultaneously.

Example K

A passenger seat for an aircraft comprising:
an adaptive belt attached to a frame of the passenger seat, the adaptive belt comprising at least a first section, a second section, and a third section, wherein:
the adaptive belt comprises a retracted configuration and a fully extended configuration;
in the retracted configuration, the adaptive belt is folded between the first section and the second section such that a first attachment attaches the first section to a first portion of the second section;
in the retracted configuration, the adaptive belt is folded between the second section and the third section such that a second attachment attaches a second portion of the second section to a first portion of the third section;
in the fully extended configuration, all of the attachments fail thereby increasing a length of the adaptive belt; and
in response to a threshold loading condition, the adaptive belt changes from the retracted configuration to the fully extended configuration.

Example L

The passenger seat of Example K or any of the preceding or subsequent examples, wherein the first attachment and the second attachment each comprise at least one of stitching, adhesive, and mechanical fasteners.

Example M

The passenger seat of Example K or any of the preceding or subsequent examples, wherein the first portion of the second section and the second portion of the second section are immediately adjacent one another on opposite surfaces of the second section.

Example N

The passenger seat of Example K or any of the preceding or subsequent examples, wherein the threshold loading condition comprises a crash load.

Example O

The passenger seat of Example K or any of the preceding or subsequent examples, wherein the first attachment fails in response to a first load and the second attachment fails in response to a second load, wherein the second load is larger than the first load.

Example P

The passenger seat of Example K or any of the preceding or subsequent examples, further comprising an intermediate configuration wherein:

in the intermediate configuration, the first attachment fails but the second attachment does not fail; and in the intermediate configuration, the adaptive belt comprises an intermediate length that is greater than a length of the adaptive belt in the retracted configuration but less than a length of the adaptive belt in the fully extended configuration.

Example Q

The passenger seat of Example K or any of the preceding or subsequent examples, further comprising a fourth section wherein, in the retracted configuration, the adaptive belt is folded between the third section and the fourth section such that a third attachment attaches a second portion of the third section to the fourth section.

Example R

The passenger seat of Example Q or any of the preceding or subsequent examples, further comprising a first intermediate configuration and a second intermediate configuration, wherein:

in the first intermediate configuration, the first attachment fails but the second attachment and the third attachment do not fail;

in the second intermediate configuration, the first attachment and the second attachment fail but the third attachment does not fail; and in the second intermediate configuration, the adaptive belt comprises a second intermediate length that is greater than (i) a length of the adaptive belt in the retracted configuration and (ii) a length of the adaptive belt in the first intermediate configuration but less than a length of the adaptive belt in the fully extended configuration.

Example S

The passenger seat of Example K or any of the preceding or subsequent examples, wherein at least one of the first section, second section, and third section comprises a delay feature to ensure that all of the attachments do not fail simultaneously.

Example T

An adaptive belt attached to a vehicle seat, the adaptive belt comprising:
a first section, a second section, and a third section, wherein:
the adaptive belt comprises a retracted configuration, a fully extended configuration, and an intermediate configuration:
in the retracted configuration, the adaptive belt is folded between the first section and the second section such that a first plurality of stitches attaches the first section to a first portion of the second section;
in the retracted configuration, the adaptive belt is folded between the second section and the third section such that a second plurality of stitches attaches a second portion of the second section to a first portion of the third section;
in the fully extended configuration, the first plurality of stitches and the second plurality of stitches fail thereby causing the adaptive belt to change length to an extended length;
in the intermediate configuration, the first plurality of stitches fails but the second plurality of stitches do not fail such that the adaptive belt comprises an intermediate length that is greater than a length of the adaptive belt in the retracted configuration but less than the extended length;
in response to a first loading condition, the adaptive belt changes from the retracted configuration to the intermediate configuration; and
in response to a second loading condition, the adaptive belt changes from the intermediate configuration to the fully extended configuration.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An adaptive belt attached to a vehicle seat, the adaptive belt comprising:
a first section, a second section, and a third section, wherein:
the first section, the second section, and the third section form a continuous belt; and
the adaptive belt comprises a retracted configuration and a fully extended configuration;
wherein, in the retracted configuration:
the adaptive belt is folded between the first section and the second section such that a first attachment attaches the first section to a first portion of the second section;
the adaptive belt is folded between the second section and the third section such that a second attachment attaches a second portion of the second section to a first portion of the third section;
the first attachment is distinct from the second attachment; and
the adaptive belt has a retracted length;
wherein, in the fully extended configuration, the first attachment and the second attachment fail, thereby increasing a length of the adaptive belt to a fully extended length; and
wherein, in response to a threshold loading condition, the adaptive belt changes from the retracted configuration to the fully extended configuration.

2. The adaptive belt of claim 1, wherein the first attachment and the second attachment each comprise at least one of stitching, adhesive, or mechanical fasteners.

3. The adaptive belt of claim 1, wherein the first portion of the second section and the second portion of the second section are immediately adjacent one another on opposite surfaces of the second section.

4. The adaptive belt of claim 1, wherein the first portion of the second section and the second portion of the second section are isolated from one another.

5. The adaptive belt of claim 1, wherein the threshold loading condition comprises a crash load.

6. The adaptive belt of claim 1, wherein the first attachment fails in response to a first load and the second attachment fails in response to a second load, wherein the second load is larger than the first load.

7. The adaptive belt of claim 1, further comprising an intermediate configuration wherein:
in the intermediate configuration, one, but not both, of the first attachment and the second attachment fails; and
in the intermediate configuration, the adaptive belt comprises an intermediate length that is greater than the retracted length but less than the fully extended length.

8. The adaptive belt of claim 1, further comprising a fourth section wherein, in the retracted configuration, the adaptive belt is folded between the third section and the fourth section such that a third attachment attaches a second portion of the third section to the fourth section.

9. The adaptive belt of claim 8, further comprising a first intermediate configuration and a second intermediate configuration, wherein:
in the first intermediate configuration, one, but not all, of the first attachment, the second attachment, and the third attachment fails;
in the second intermediate configuration, two, but not all, of the first attachment, the second attachment, and the third attachment fails;
in the first intermediate configuration, the adaptive belt comprises a first intermediate length that is greater than the retracted length but less than the fully extended length; and
in the second intermediate configuration, the adaptive belt comprises a second intermediate length that is greater than the first intermediate length but less than the fully extended length.

10. The adaptive belt of claim 1, wherein at least one of the first section, second section, or third section comprises a delay feature to ensure that the first attachment and the second attachment do not fail simultaneously.

11. A passenger seat for an aircraft comprising:
an adaptive belt attached to a frame of the passenger seat, the adaptive belt comprising:
at least a first section, a second section, and a third section, wherein:
the first section, the second section, and the third section form a continuous belt; and the adaptive belt comprises a retracted configuration and a fully extended configuration;

wherein, in the retracted configuration:

the adaptive belt is folded between the first section and the second section such that a first attachment attaches the first section to a first portion of the second section;

the adaptive belt is folded between the second section and the third section such that a second attachment attaches a second portion of the second section to a first portion of the third section;

the first attachment is distinct from the second attachment; and the adaptive belt has a retracted length;

wherein, in the fully extended configuration, the first attachment and the second attachment fail, thereby increasing a length of the adaptive belt to a fully extended length; and wherein, in response to a threshold loading condition, the adaptive belt changes from the retracted configuration to the fully extended configuration.

12. The passenger seat of claim 11, wherein the first attachment and the second attachment each comprise at least one of stitching, adhesive, or mechanical fasteners.

13. The passenger seat of claim 11, wherein the first portion of the second section and the second portion of the second section are immediately adjacent one another on opposite surfaces of the second section.

14. The passenger seat of claim 11, wherein the threshold loading condition comprises a crash load.

15. The passenger seat of claim 11, wherein the first attachment fails in response to a first load and the second attachment fails in response to a second load, wherein the second load is larger than the first load.

16. The passenger seat of claim 11, further comprising an intermediate configuration wherein:

in the intermediate configuration, one, but not both, of the first attachment and the second attachment fails; and in the intermediate configuration, the adaptive belt comprises an intermediate length that is greater than the retracted length but less than the fully extended length.

17. The passenger seat of claim 11, further comprising a fourth section wherein, in the retracted configuration, the adaptive belt is folded between the third section and the fourth section such that a third attachment attaches a second portion of the third section to the fourth section.

18. The passenger seat of claim 17, further comprising a first intermediate configuration and a second intermediate configuration, wherein:

in the first intermediate configuration, one, but not all, of the first attachment, the second attachment, and the third attachment fails;

in the second intermediate configuration, two, but not all, of the first attachment, the second attachment, and the third attachment fails;

in the first intermediate configuration, the adaptive belt comprises a first intermediate length that is greater than the retracted length but less than the fully extended length; and in the second intermediate configuration, the adaptive belt comprises a second intermediate length that is greater than the first intermediate length but less than the fully extended length.

19. The passenger seat of claim 11, wherein at least one of the first section, second section, or third section comprises a delay feature to ensure that the first attachment and the second attachment do not fail simultaneously.

20. An adaptive belt attached to a vehicle seat, the adaptive belt comprising:

a first section, a second section, and a third section, wherein:

the first section, the second section, and the third section form a continuous belt; and the adaptive belt comprises a retracted configuration, a fully extended configuration, and an intermediate configuration;

wherein, in the retracted configuration:

the adaptive belt is folded between the first section and the second section such that a first plurality of stitches attaches the first section to a first portion of the second section;

the adaptive belt is folded between the second section and the third section such that a second plurality of stitches attaches a second portion of the second section to a first portion of the third section;

the first plurality of stitches are distinct from the second plurality of stitches;

the adaptive belt has a retracted length;

wherein, in the fully extended configuration, the first plurality of stitches and the second plurality of stitches fail, thereby causing the adaptive belt to change length to a fully extended length;

wherein, in the intermediate configuration, one, but not both, of the first plurality of stitches and the second plurality of stitches fail such that the adaptive belt comprises an intermediate length that is greater than the retracted length but less than the fully extended length;

wherein, in response to a first loading condition, the adaptive belt changes from the retracted configuration to the intermediate configuration; and wherein, in response to a second loading condition, the adaptive belt changes from the intermediate configuration to the fully extended configuration.

* * * * *